United States Patent
Neef et al.

(10) Patent No.: US 10,280,369 B2
(45) Date of Patent: May 7, 2019

(54) THERMAL BARRIER MIXTURES AND USES THEREOF

(71) Applicant: The Board of Regents of the University of Texas System, Austin, TX (US)

(72) Inventors: Charles J. Neef, Bastrop, TX (US); John Lee Massingill, Jr., San Marcos, TX (US); Clois E. Powell, Seguin, TX (US)

(73) Assignee: Board of Regents of the University of Texas System, Austin, TX (US)

(*) Notice: Subject to any disclaimer, the term of this patent is extended or adjusted under 35 U.S.C. 154(b) by 0 days.

(21) Appl. No.: 14/395,720

(22) PCT Filed: Apr. 22, 2013

(86) PCT No.: PCT/US2013/037589
§ 371 (c)(1),
(2) Date: Oct. 20, 2014

(87) PCT Pub. No.: WO2014/011303
PCT Pub. Date: Jan. 16, 2014

(65) Prior Publication Data
US 2015/0080508 A1 Mar. 19, 2015

(51) Int. Cl.
*C09D 5/18* (2006.01)
*C09K 21/02* (2006.01)
(Continued)

(52) U.S. Cl.
CPC .......... *C09K 21/02* (2013.01); *B82Y 30/00* (2013.01); *C09C 1/0081* (2013.01); *C09C 1/405* (2013.01);
(Continued)

(58) Field of Classification Search
CPC . C09D 5/18; C08K 7/26; C08K 5/521; C09K 21/02; C09K 21/12
See application file for complete search history.

(56) References Cited

U.S. PATENT DOCUMENTS 2,727,876 A * 12/1955 Iler .................... 523/216
5,484,564 A * 1/1996 Goto .................. B29C 43/14
264/219

(Continued)

FOREIGN PATENT DOCUMENTS

CN 1091445 8/1994
CN 101463154 6/2009
(Continued)

OTHER PUBLICATIONS

Derwent Abstract of CN 102241889 (Acc. No. 2011-Q77644, Nov. 2011).*
(Continued)

*Primary Examiner* — Brieann R Johnston
(74) *Attorney, Agent, or Firm* — Meyertons, Hood, Kivlin, Kowert & Goetzel, P.C.; Mark R. DeLuca

(57) ABSTRACT

Thermal barrier mixtures and method of making the thermal barrier mixtures are described herein. The thermal barrier mixtures may be used to make thermal barrier coatings. Thermal barrier mixture may include halloysite and one or more silicon compounds.

7 Claims, 2 Drawing Sheets

(51) Int. Cl.
*C09K 21/12* (2006.01)
*B82Y 30/00* (2011.01)
*C09C 1/40* (2006.01)
*C09C 1/00* (2006.01)

(52) U.S. Cl.
CPC ............... *C09D 5/18* (2013.01); *C09K 21/12* (2013.01); *C01P 2004/13* (2013.01); *C01P 2006/32* (2013.01)

(56) References Cited

U.S. PATENT DOCUMENTS

| | | | |
|---|---|---|---|
| 5,651,976 A * | 7/1997 | Price et al. | 424/409 |
| 5,968,669 A | 10/1999 | Liu et al. | |
| 6,642,284 B2 | 11/2003 | Thewes et al. | |
| 7,144,527 B2 | 12/2006 | Thewes et al. | |
| 7,652,090 B2 | 1/2010 | Alexander et al. | |
| 7,928,160 B2 | 4/2011 | Senkfor et al. | |
| 8,030,229 B2 | 10/2011 | Ahluwalia et al. | |
| 8,048,486 B2 | 11/2011 | Nosker et al. | |
| 2005/0031843 A1 | 2/2005 | Robinson et al. | |
| 2005/0229809 A1 | 10/2005 | Lally | |
| 2007/0106006 A1 * | 5/2007 | Cooper | C08K 3/04 524/445 |
| 2007/0166454 A1 | 7/2007 | Gupta | |
| 2007/0197686 A1 | 8/2007 | Dimanshteyn et al. | |
| 2008/0125504 A1 | 5/2008 | Reinheimer | |
| 2008/0248201 A1 | 10/2008 | Corkery et al. | |
| 2009/0215926 A1 | 8/2009 | Kozlowski et al. | |
| 2009/0326133 A1* | 12/2009 | Daly | C08K 3/346 524/445 |
| 2011/0089386 A1 | 4/2011 | Berry et al. | |
| 2011/0105649 A1 | 5/2011 | Harada et al. | |
| 2011/0160345 A1 | 6/2011 | Cooper et al. | |

FOREIGN PATENT DOCUMENTS

| | | | |
|---|---|---|---|
| CN | 101899263 A * | 12/2010 | |
| CN | 102241889 A * | 11/2011 | |
| EP | 0005387 A1 * | 11/1979 | ....... H01C 17/06546 |
| EP | 0354632 | 2/1990 | |
| EP | 1616924 | 1/2006 | |
| EP | 1645590 | 4/2006 | |
| EP | 1683841 | 7/2006 | |
| EP | 2093263 | 8/2009 | |
| JP | 07245015 A * | 9/1995 | |
| JP | 2007321024 | 12/2007 | |
| KR | 100604984 | 7/2006 | |
| WO | 85/04860 | 11/1985 | |
| WO | 99/43390 | 9/1999 | |
| WO | 01/66669 | 9/2001 | |
| WO | 2004/056913 | 7/2004 | |
| WO | 2006/005716 | 1/2006 | |
| WO | 2007/056382 | 5/2007 | |
| WO | WO 2009043376 A1 * | 4/2009 | |
| WO | 2012/024415 | 2/2012 | |

OTHER PUBLICATIONS

Machine translated English language equivalent of JP 07245015 (Sep. 1995, 3 pages).*
Machine translated English language equivalent of CN 101899263 (Dec. 2010, 6 pages).*
Machine translated English language equivalent of EP 0005387 (Nov. 1979 5 pages).*
International Search Report/Written Opinion for PCT Application No. PCT/US2013/037589 dated Dec. 26, 2013.
International Preliminary Report on Patentability for PCT Application No. PCT/US2013/037589 dated Oct. 21, 2014.
Prashantha "Processing and characterization of halloysite nanotubes filled polypropylene nanocomposites based on a masterbatch route: effect of halloysites treatment on structural and mechanical properties" eXPRESS Polymer Letters (2011), vol. 5, No. 4, 265-307.

* cited by examiner

THERMAL BARRIER MIXTURES AND USES THEREOF

GOVERNMENT INTEREST

The Government has certain rights in this invention pursuant to Agreement No. W9132T09-C-0044 between Advanced Materials and Processes, and the United States Army.

BACKGROUND

1. Field of the Invention

The present invention relates generally to compounds for making thermal barrier coatings. In particular, this invention relates to mixtures that provide a thermal barrier for use in thermal barrier coatings.

2. Description of Related Art

Flame retardant coatings are important for the reduction or elimination of damage to structures caused by fires. Many coatings are used for protection of wooden and steel structures. In general, these coatings retard fires either by chemical reactions to eliminate the fire or by shielding the substrate during a fire. Substrates that shield a substrate may include hydrates. During a fire as the hydrates are consumed, water vapor is released, which cools the fire. The compounds may also produce char, which is a poor conductor of heat and a barrier to gas release from the substrate, thus retarding heat transfer and flammability.

Many compounds that include hydrates are susceptible to environmental influences such as humidity. Humidity may reduce or negate the compounds ability to swell. Other compounds may be added to a flame retardant coating to improve fire retardant properties. The compounds, however, may affect moldability, tensile characteristic or other physical properties of the final product. Many flame retardant coatings include halogens, which may be harmful to the environment.

Although, there has been a significant amount of effort to develop methods and systems to produce thermal barrier coatings there is still need to produce thermal barrier coatings that retard fires and are environmentally safe.

SUMMARY

Thermal barrier mixtures, thermal barrier coatings, and uses thereof are described herein. In some embodiments, thermal barrier mixture includes halloysite and one or more silicon compounds. In some embodiments, the thermal barrier mixture or thermal barrier compounds is combined with one or more polymeric compounds to form a thermal barrier coating. Such a thermal barrier coating may be applied to steel, plastic, wood, or combinations thereof. The thermal barrier coating provides thermal protection for the substrate during a fire.

In further embodiments, features from specific embodiments may be combined with features from other embodiments. For example, features from one embodiment may be combined with features from any of the other embodiments.

In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
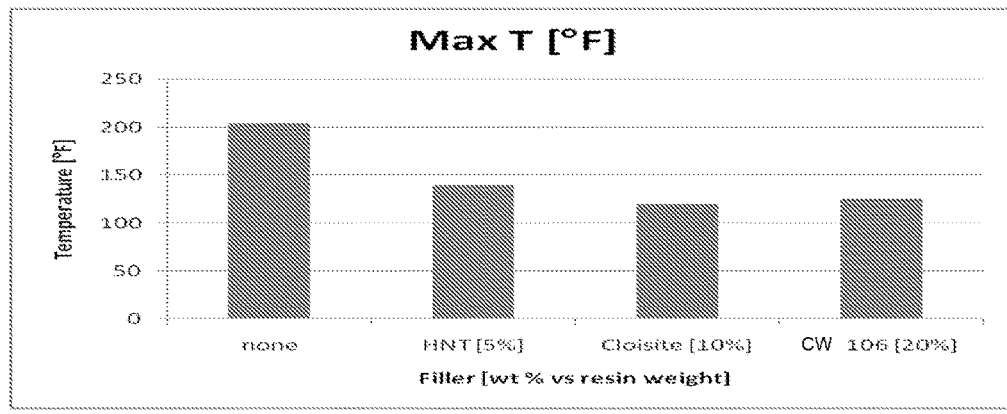
FIG. 1 is a graphical representation of embodiments of thermal barrier coatings containing halloysite, Cloisite®, and ceramic microspheres in weight percentages versus temperature.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Thermal barrier mixtures and methods to make the thermal barrier coatings are described herein. The thermal barrier mixtures exhibit enhanced thermal protection as compared to conventional materials. Thermal barrier mixtures may be used to make thermal barrier coatings. The thermal barrier coating may be used to coat wood, steel, plastic, and/or used in polymer formulations. A portion or compounds of the thermal barrier mixtures may swell when exposed to heat or a flame, providing insulation between the flame and the substrate. Thermal barrier mixtures described herein may used as intumescent coatings and/or materials.

Thermal barrier mixtures may include, but are not limited to, halloysite, smectite, ceramic microspheres, a silicon compounds, or mixtures thereof. In some embodiments, thermal barrier mixtures include halloysite nanotubes. In some embodiments, thermal barrier mixtures include halloysite nanotubes, silicone carbide, and phosphate esters.

Halloysite is an aluminosilicate clay mineral. Halloysite occurs naturally as a nanotube. For example, halloysite nanotubes may have a diameter of less than 100 nanometers and a length ranging from 500 nanometers to over 1.2 micron. Halloysite may include from 10% by weight to 20% by weight water. In some embodiments, halloysite include hydrates. Hydrated halloysite has empirical formula of $Al_2Si_2O_5(OH)_4$. Halloysite nanotubes may provide excellent thermal stability and retains 85% of its weight during a fire. During the fire, the hydrates may be released as water and cool the fire. A weight of halloysite nanotubes in a thermal barrier coating may range from about 0.1 wt % to about 30 wt %.

Smectite is a hydrous aluminum phyllosilicate that includes various amounts of iron, magnesium alkali metals, and/or alkaline earth metals. Examples of smectite include, montmorillonite, hectorite, and saponite. Montmorillonite swells in water and exhibits high cationic-exchange properties. In some embodiments, montmorillonite include nano particles, and thus may be referred to as a nanoclay. Montmorillonite is available under the commercial name of Cloisite® (Southern Clay Products, Gonzales, Tex.).

Ceramic microspheres include silica and alumina particles that are spherical in shape and filled with air or inert gas. A particle size of ceramic microspheres may range from about 10 microns to about 110 microns. A bulk density of ceramic microspheres may be about 0.3 g/mL. Ceramic microspheres are available under the name CW-106 from CenoStar Corporation (Newburyport, Mass.).

Silicon compounds include silicon carbide (carborundum), silicon nitride, and organosilicons. Organosilicons include siloxanes and/or polysiloxanes. Examples of siloxanes include bishydroxypropyldimethylsiloxane (commonly known as carbinol terminated polydimethyl siloxane). Dimethyl siloxanes are available under the commercial names DMS-C16 and DMS-T21 from Gelest (Morrisville, Pa.). The silicon compound may enhance the thermal barrier properties of the clay compound. In some embodiments, a weight ratio of total clay compound to total silicon compounds ranges from 1:0 to 0:1. In some embodiments, a total amount of clay compound and silicon compound ranges between 0.1 wt % to 50 wt % base on total resin weight.

In some embodiments, the thermal barrier coating may include one or more phosphate ester compounds. Phosphate esters may be used to increase char formation during a fire. An increased char may create a barrier between the substrate and the flames. An example of a phosphate ester includes phosphoric trichloride polymer with 1,3-benzenediol phenyl ester (commonly known as resorcinol bis-diphenyl phosphate as is sold under the name Reofus® RDP. Phosphate esters are available from Chemtura, Middlebury, Conn., USA).

The thermal barrier mixtures may be mixed with thermoplastic compounds to make coating compounds. Thermoplastic compounds include, but are not limited to, polyurethanes, polyexpoxide resins (epoxies), fatty acid modified polyester (alkyd), latex, and polysiloxanes. For example, the thermal barrier compounds may be mixed with alcohols, mono and polydimethysiloxanes to prepare polyurethane compounds. The thermal barrier compounds (mixtures) may be mixed with the coating compounds using standard resin preparation techniques. In some embodiments, a total amount of clay compound and silicon compound ranges between 0.1 wt % to 50 wt % base on total resin weight.

EXAMPLES

Non-limiting examples are set forth.

The thermal barrier properties of thermal barrier coatings described herein tested using a flame test. The flame of a propane torch is adjusted to a length of 1.25". A thermal barrier coating cast on a Q-panel is then place at 1" from the nozzle. The back-side temperature of the Q-Panel is recorded for 10 minutes at 1 minute intervals. A back-side temperature of less than 200° C. is considered passing.

Example 1

A resin that included a two component polyurethane of polydimethysiloxane (DMS-C16, Gelest), trihydroxymethyl ethane (Sigma-Aldrich Chemical Co.) and diphenylmethane diisocyanate (Suprasec® 9561, Huntman International, LLC) was formulated with 5 wt. % halloysite nanotubes (NaturalNano, Rochester, N.Y.), 10 wt % montmorillonite, (Cloisite® Southern Clay Products) or 20 wt % ceramic microspheres based on total weight of resin. FIG. 1 is a graphical representation of weight percentages of halloysite, Cloisite®, and ceramic microspheres in a thermal barrier coating versus temperature. The sample containing 5 wt. % halloysite nanotubes exhibited a backside temperature of less than 150° F. Samples containing 10 wt % Cloisite® or 20 wt % CW 106 exhibited backside temperatures of less than 150° F. As shown in FIG. 1, samples with halloysite nanotubes showed enhanced thermal barrier properties with as little as a 5 wt. % loading as compared to samples containing no halloysite nanotubes, montmorillonite, or ceramic microspheres.

Example 2

Figure 2:
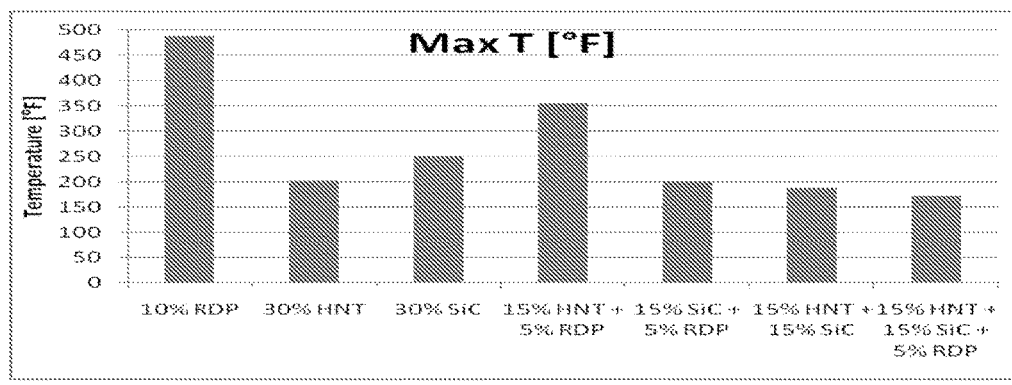
FIG. 2 is a graphical representation of embodiments of thermal barrier coatings containing halloysite, silicon carbide, phosphate ester, and various mixtures thereof in weight percentages versus temperature.

A two-component polyurethane was formulated from G31-35 propane diol, and Suprasec® 9561 with various amounts of halloysite, silicon carbide, and resorcinol bis-diphenylphosphate (Chemtura, Reofus® RDP). FIG. 2 is a graphical representation of weight percent of thermal barrier coatings containing halloysite, silicon carbide, phosphate ester and various mixtures thereof versus temperature. As shown in FIG. 2, the mixtures containing halloysite nanotubes [15% wt % vs. resin wt.], SiC [15% wt % vs. resin wt.] and halloysite nanotubes, SiC and phosphate ester exhibited a lower backside temperature during a flame test than each component or combination of each two components. Addition of the phosphate ester enhanced the thermal barrier properties through increased char.

Example 3

Figure 3:
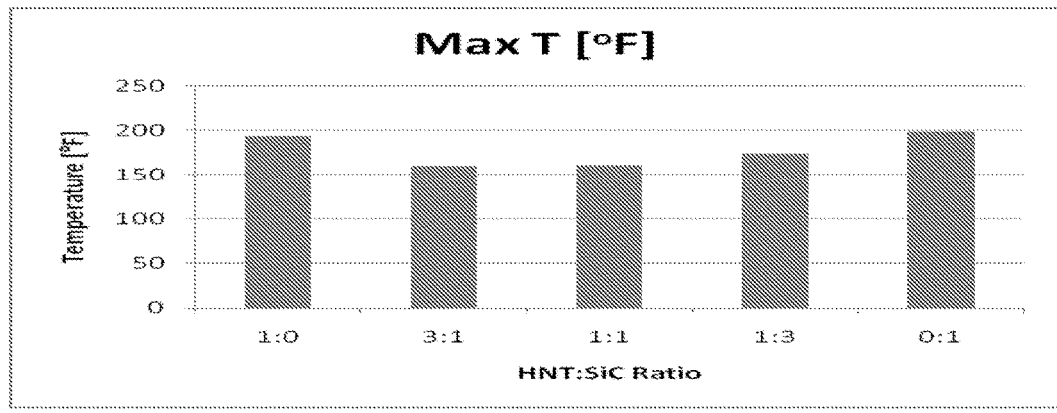
FIG. 3 is a graphical representation of embodiments of thermal barrier coatings containing various ratios of halloysite to silicon carbide and constant amounts of phosphate ester versus temperature.

The same mixtures of Example 2 were used in Example 3. A ratio of halloysite to silicon carbide was varied from 1:0 to 0:1 while holding the level of phosphate ester constant. FIG. 3 is a graphical representation of thermal barrier coating containing various ratios of halloysite to silicon carbide while holding a weight of phosphate ester constant versus temperature. As shown in FIG. 3, a combination of halloysite and silicone carbide exhibited lower backside temperatures than halloysite or silicon carbide alone. A 3:1 ratio of halloysite nanotubes to silicon carbide exhibited the enhanced thermal properties.

Example 4

Figure 4:
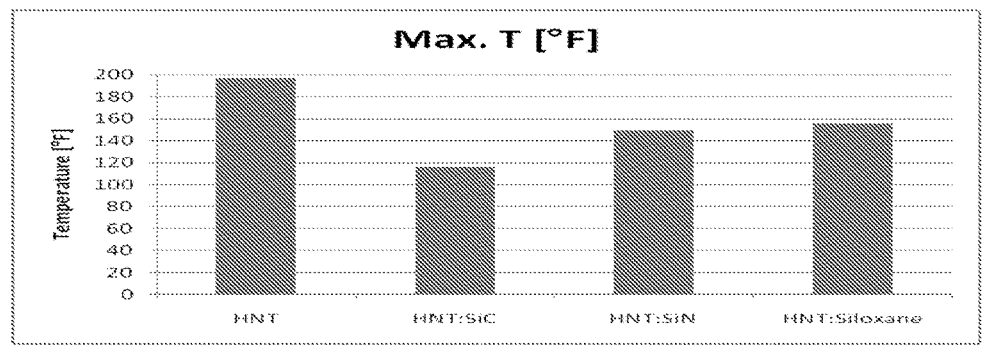
FIG. 4 depicts a graphical representation of embodiments of epoxy thermal barrier coatings containing thermal barrier mixtures versus temperature.

Thermal barrier coatings using epoxy resins, phosphate esters halloysite, and silicon compounds were prepared. Epoxy resin (DER 325, Dow™ Chemical Co.) was mixed with halloysite nanotubes and a phosphate ester. A three to one ratio of halloysite and silicon carbide was mixed with an epoxy resin and a phosphate ester. The amount of halloysite/silicon carbide was 30 wt % based on total coating composition. A three to one ratio of halloysite and silicon nitride was mixed with an epoxy resin and a phosphate ester. The amount of halloysite/silicone nitride was 30 wt % based on total coating composition. A three to one ratio of halloysite and polydimethylsiloxane emulsion (DMS-T21, Gelest) was mixed with an epoxy resin and a phosphate ester. The amount of halloysite/siloxane was 30 wt % based on total coating composition. FIG. 4 depicts a graphical representation of embodiments of epoxy thermal barrier coatings versus temperature. As shown in FIG. 4. For each of the samples the combination of halloysite nanotubes with a silicon source showed improved thermal barrier properties with an epoxy polymer resins.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a core" includes a combination of two or more cores and reference to "a compound" includes mixtures of compounds.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A thermal barrier coating comprising halloysite nanotubes, silicon carbide, and ceramic microspheres.

2. The thermal barrier mixture of claim 1, further comprising one or more phosphate esters.

3. A thermal barrier coating comprising one or more polymeric compounds, halloysite nanotubes, silicon carbide, and ceramic microspheres, wherein a total amount of halloysite and silicon carbide is between 0.1 and 50% based on the total weight of the one or more polymeric compounds.

4. The thermal barrier coating composition of claim 3, wherein at least one of the polymeric compounds is selected from the group consisting of polyurethanes, epoxies, polyester, polysiloxanes, and latex.

5. The thermal barrier coating of claim 3, further comprising one or more phosphate esters.

6. A method of making a protective coating for a substrate, comprising applying a thermal barrier coating to one or more substrates, wherein the thermal barrier coating comprises one or more polymeric compounds, halloysite nanotubes, ceramic microspheres, and silicon carbide, wherein a total amount of halloysite and silicon carbide is between 0.1 and 50% based on the total weight of the one or more polymeric compounds.

7. The method of claim 6, wherein the substrate is selected from steel, plastic, wood, or mixtures thereof.

* * * * *